Figure 1:
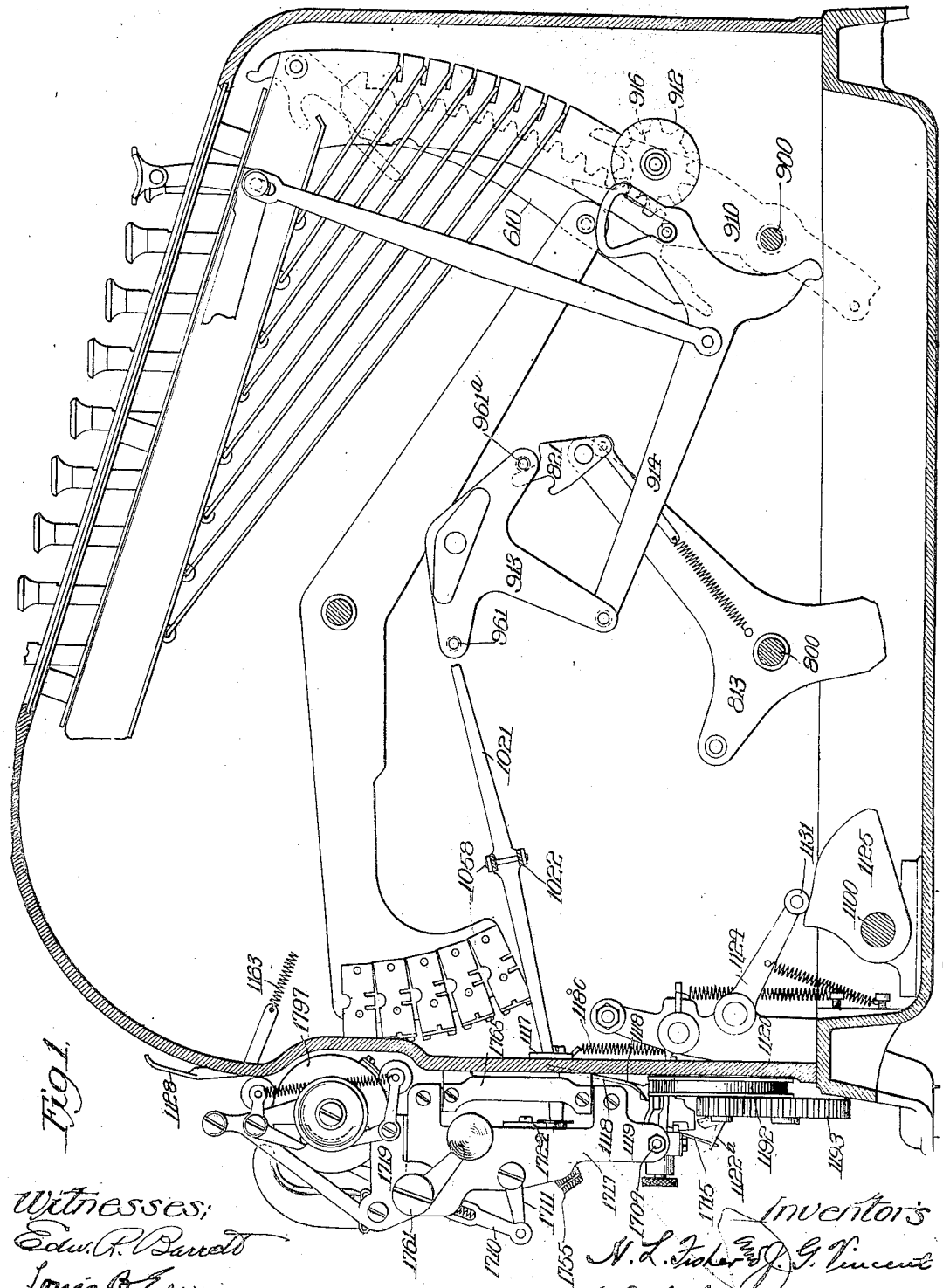

H. L. FISHER & J. G. VINCENT.
ADDING MACHINE.
APPLICATION FILED MAR. 30, 1905.

988,700.

Patented Apr. 4, 1911.
7 SHEETS—SHEET 1.

Witnesses:
Edw. R. Barrett
Louis B. Erwin

Inventors
H. L. Fisher and J. G. Vincent
By Hector V. Hebben
Attys

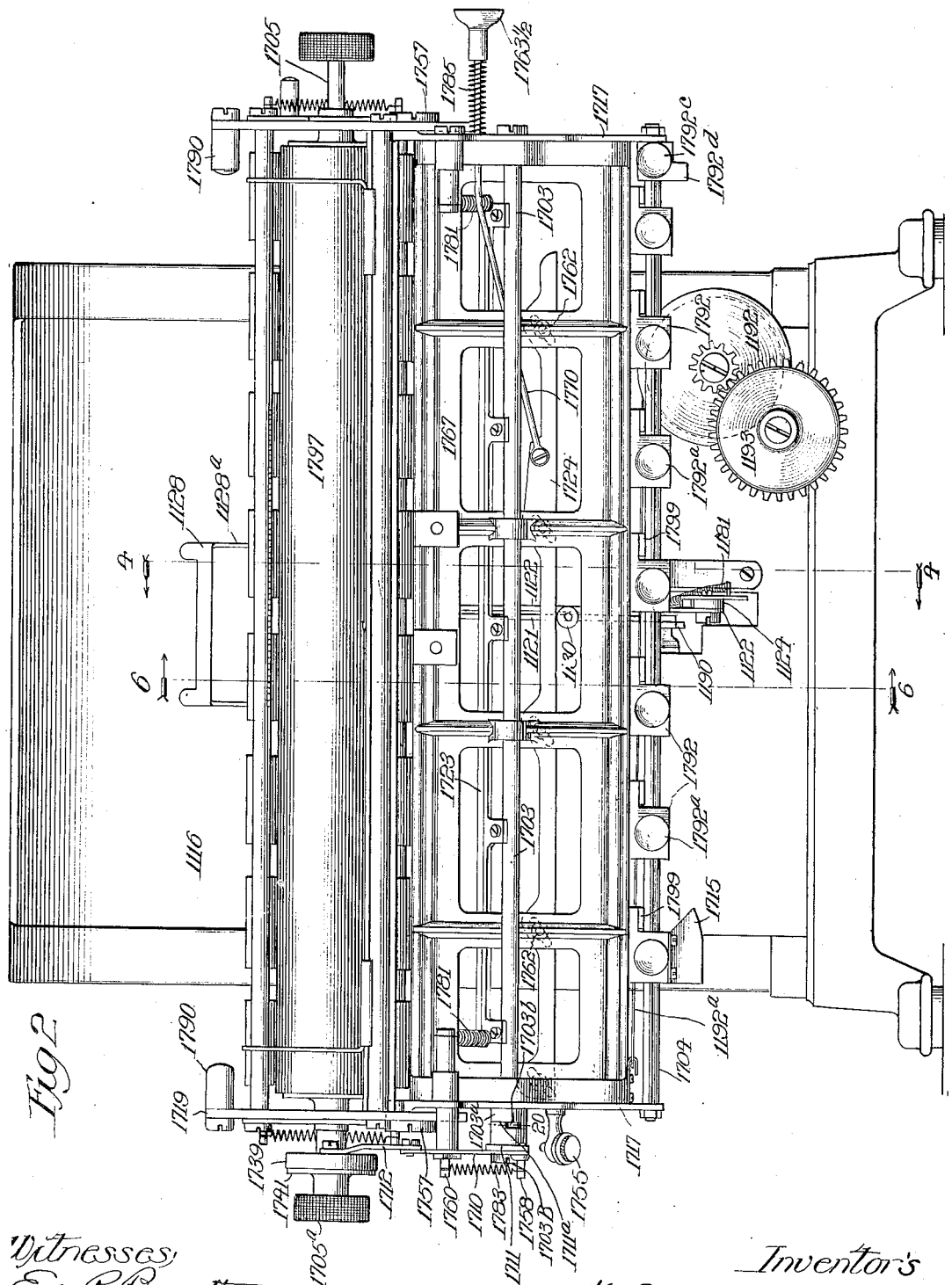

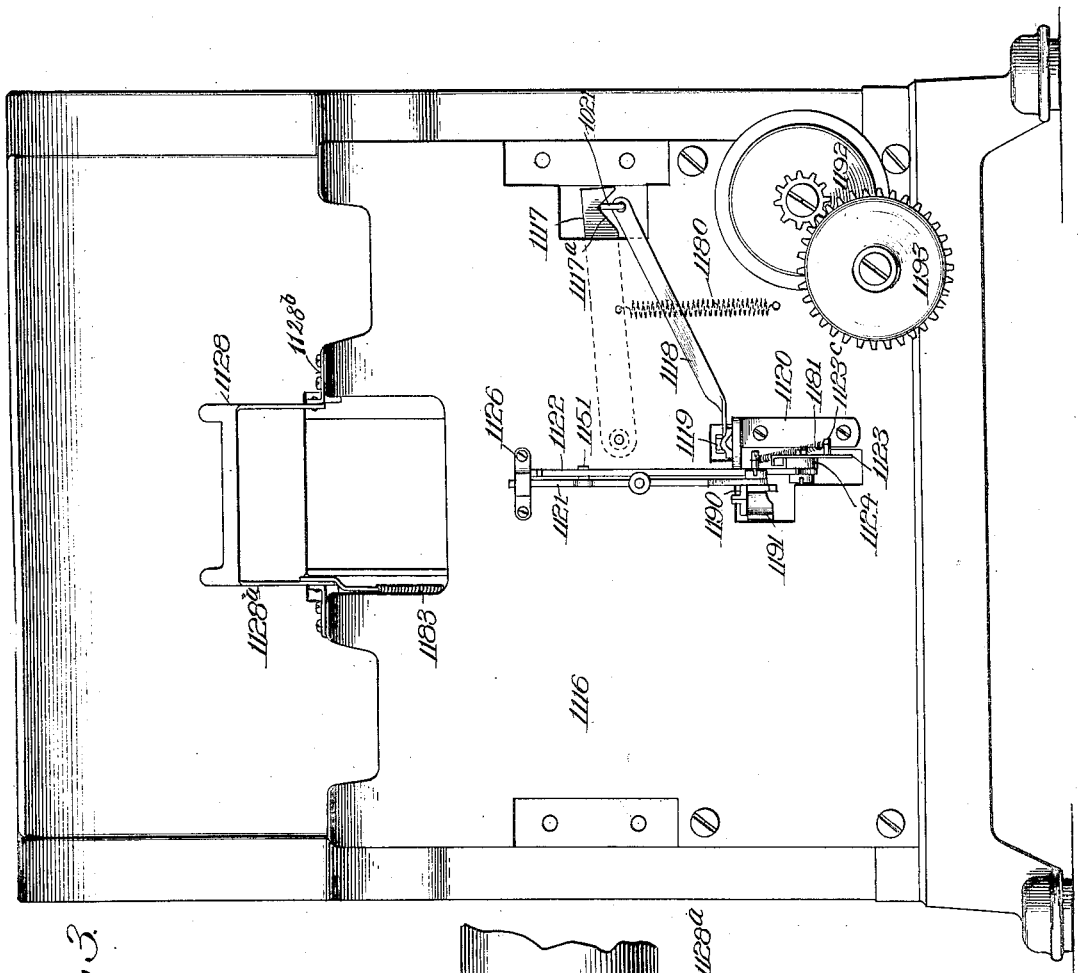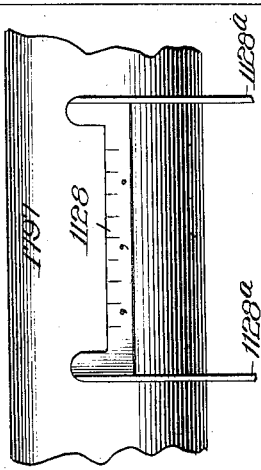

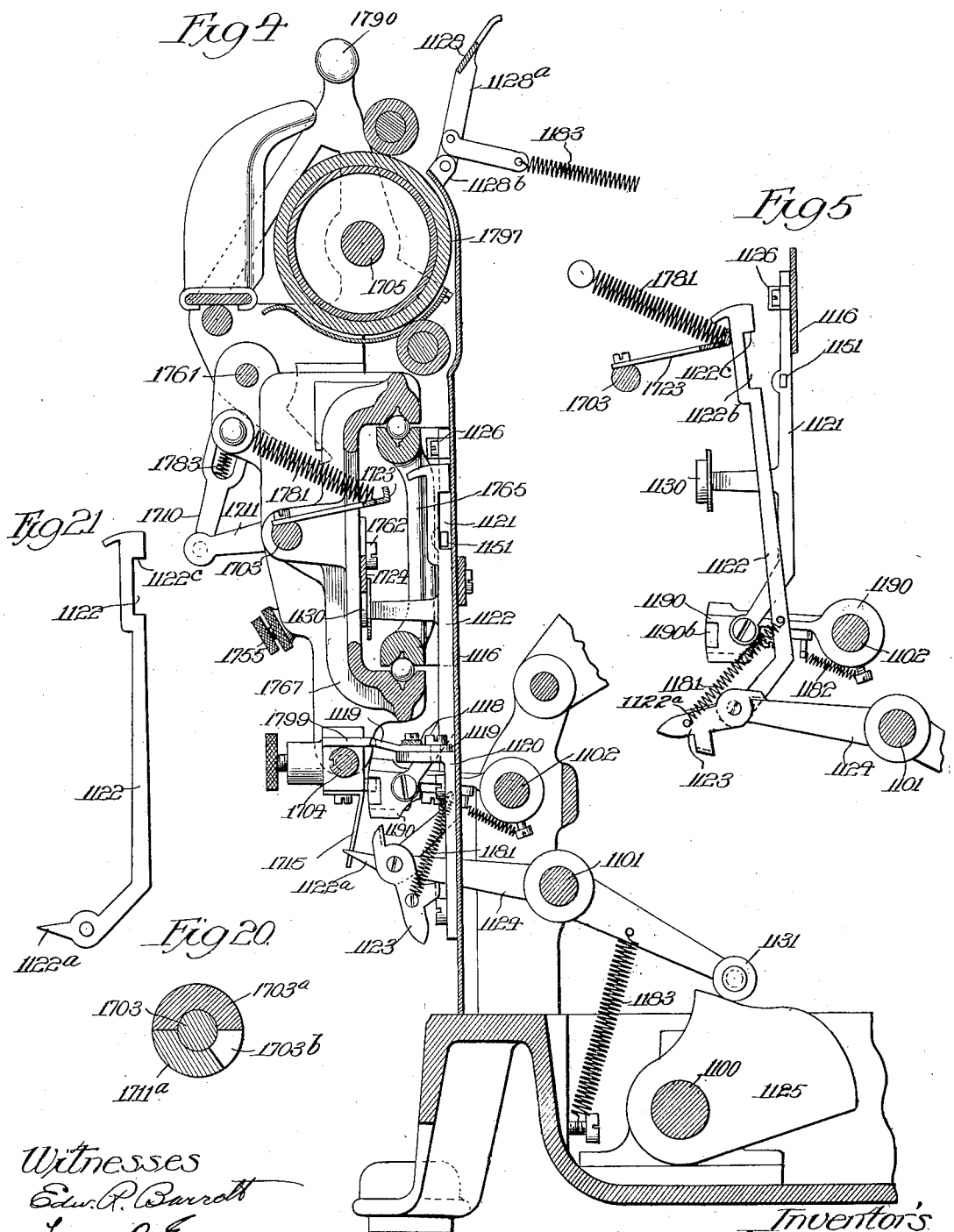

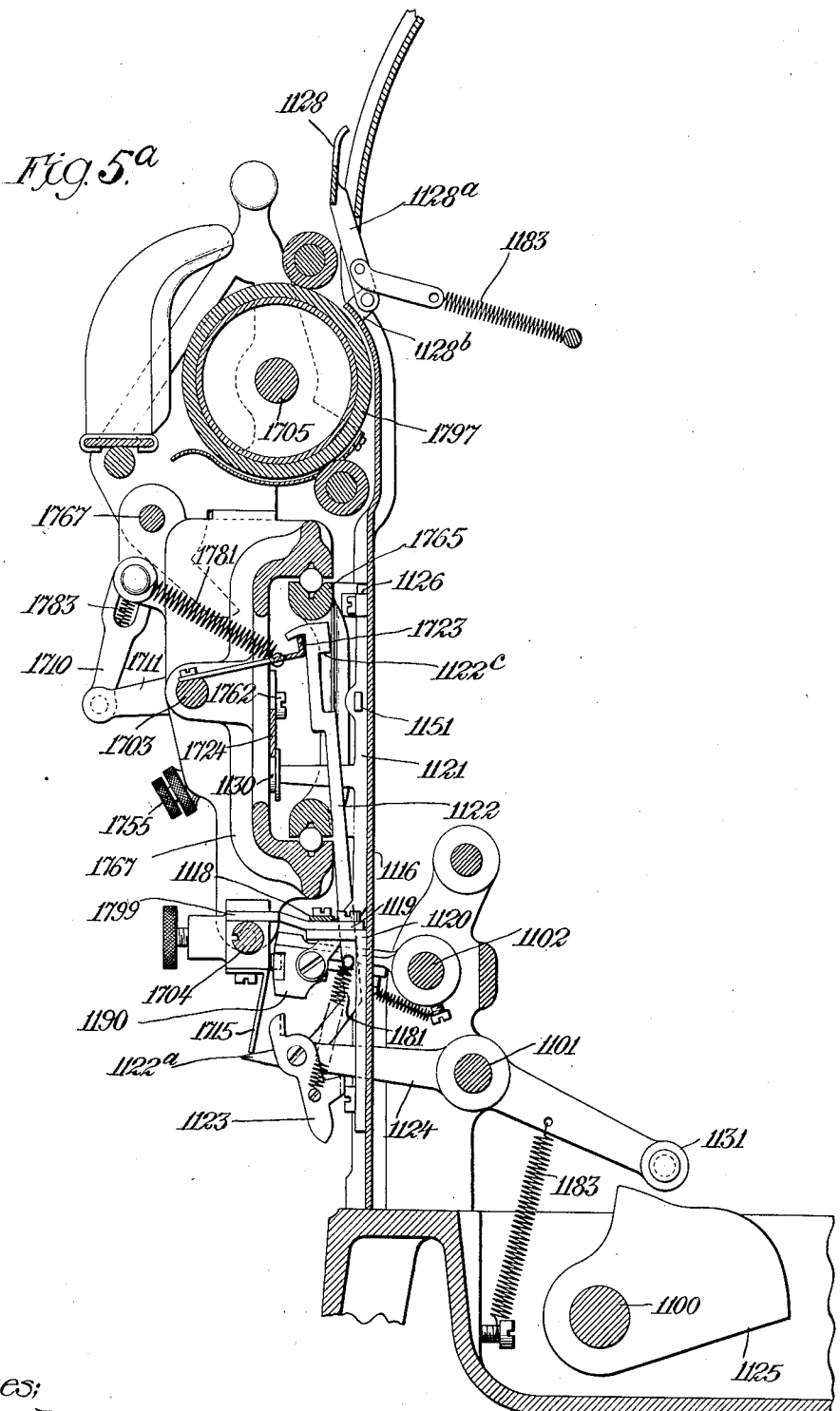

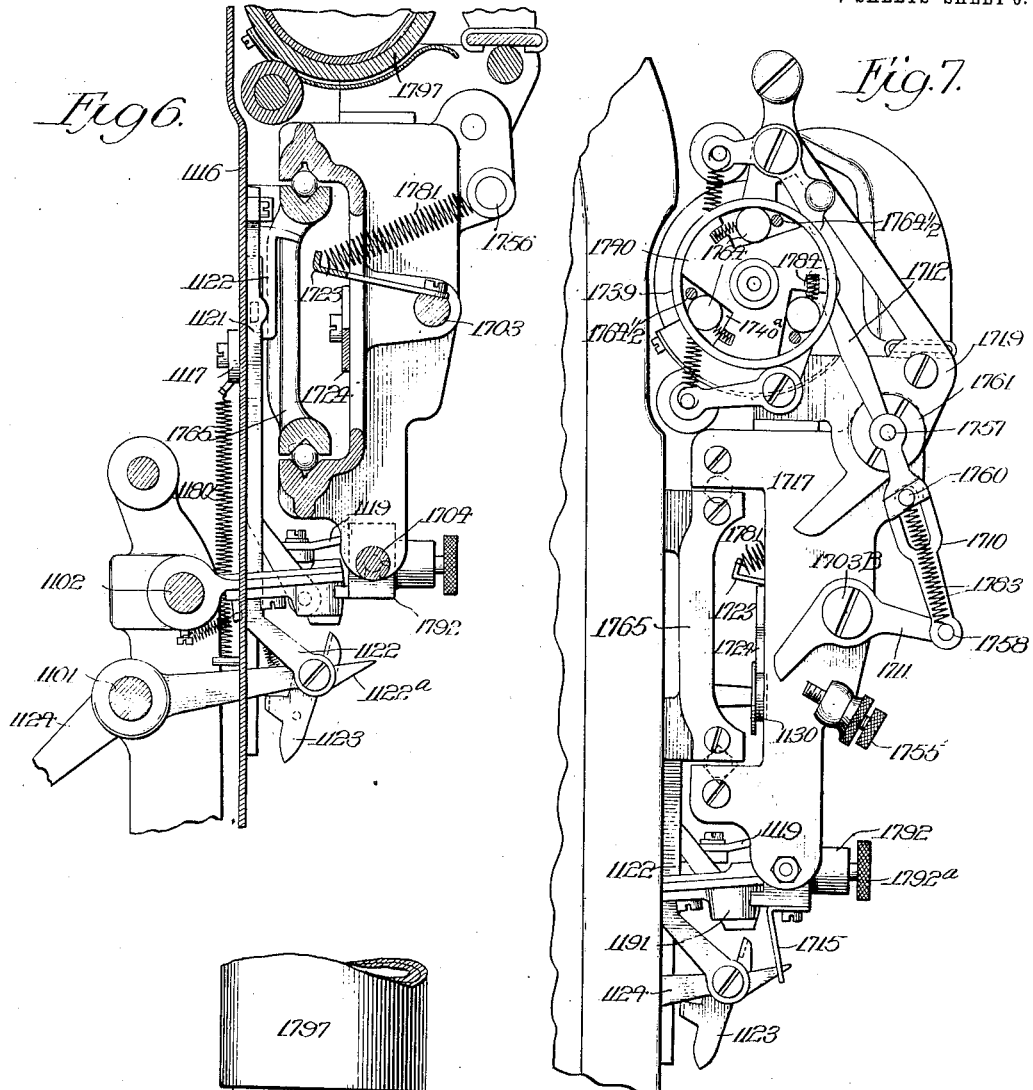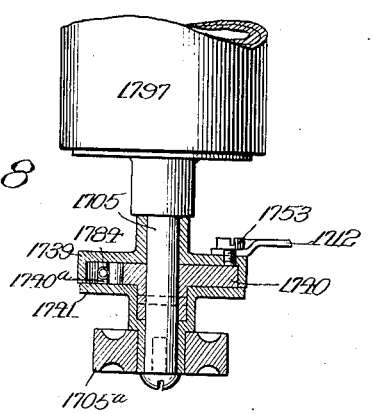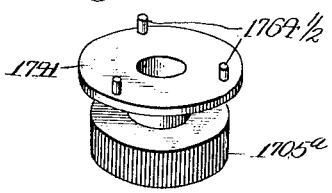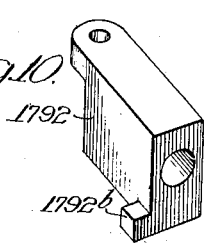

H. L. FISHER & J. G. VINCENT.
ADDING MACHINE.
APPLICATION FILED MAR. 30, 1905.
988,700.
Patented Apr. 4, 1911.
7 SHEETS—SHEET 7.
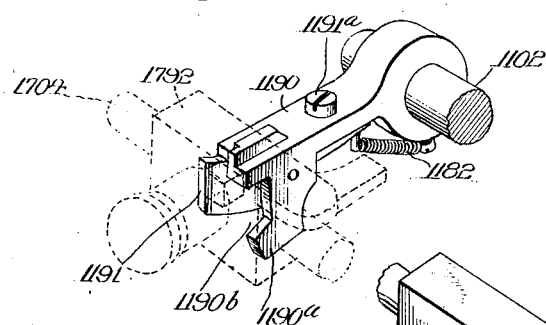
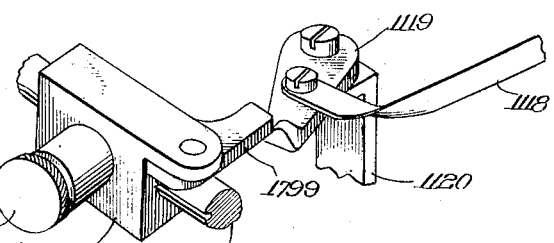
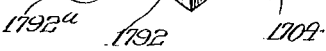
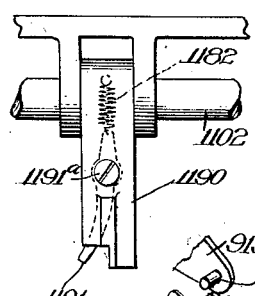
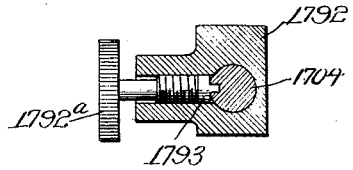
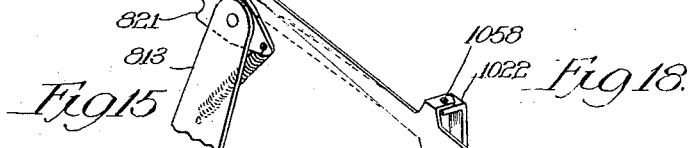
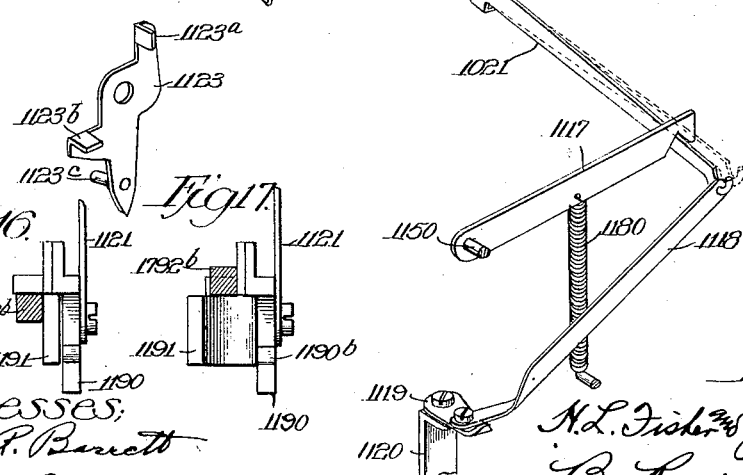

UNITED STATES PATENT OFFICE.

HARVEY L. FISHER AND JESSE G. VINCENT, OF DETROIT, MICHIGAN, ASSIGNORS TO BURROUGHS ADDING MACHINE COMPANY, OF DETROIT, MICHIGAN, A CORPORATION OF MICHIGAN.

ADDING-MACHINE.

988,700. Specification of Letters Patent. Patented Apr. 4, 1911.

Application filed March 30, 1905. Serial No. 252,822.

*To all whom it may concern:*

Be it known that we, HARVEY L. FISHER and JESSE G. VINCENT, residing at Detroit, Wayne county, Michigan, have invented certain new and useful Improvements in Adding-Machines, of which the following is a specification.

This invention relates to what are commonly known as calculating or adding machines adapted to print, list, and add or calculate individual items, and such invention relates more particularly to that type of adding machine provided with a laterally or longitudinally movable paper carriage for receiving and holding the paper on which the items in different columnar positions are printed.

The principal object of our invention is to provide novel and efficient mechanism, actuated by or under the control of the paper carriage in its different positions, for controlling the operation or action of the adding or accumulating mechanism of the machine, with the result that in one or more positions of the carriage the machine will operate normally as an adding machine—that is, with its adding or accumulating functions uninterfered with, and in another position or positions of the carriage with the adding or accumulating mechanism thrown out of action by an interference provided for the purpose. By this means, the machine is capable of printing and adding some of the items of a series of items printed crosswise of a sheet of paper and of merely printing the others of such series, according to any sequence as to accumulated and non-accumulated items, as determined by the operator. In other words, the arrangement is such that the machine is enabled to print on the same horizontal line, for example, an item or items to be added or accumulated and then one or more items or amounts not to be added or accumulated, such accumulated and non-accumulated items following each other alternately in separate groups or in any other sequence or arrangement as determined by the set adjustment of our novel mechanism. The sequence is determined by the particular class of accountant work to be done and the construction of our machine is such that a great variety of classes of accountant work may be performed after simple adjustments have been made on the machine.

Our invention is particularly applicable to what is known as a Burroughs adding machine, such as illustrated, for instance, in Burroughs's Patents Nos. 504,963 and 505,078, issued on September 12, 1893, in which machine our invention may be readily incorporated, and for the sake of clear and definite description such invention has been illustrated in connection with this particular type and construction of machine and will now be described in connection therewith, without intention of limitation thereto, inasmuch as it will be understood that our invention is applicable to other makes or constructions of similar character and used for similar purposes.

In the drawings, Figure 1 is an elevation of the left-hand side of the Burroughs machine, to which our invention has been applied; Fig. 2 a rear elevation thereof; Fig. 3 a similar elevation with the carriage and carriage supporting frame removed; Fig. 4 a sectional elevation on the line 4—4 of Fig. 2 looking in the direction of the arrow; Fig. 5 a sectional elevation showing certain parts under a different adjustment than the same parts appear in Fig. 4; Fig. 5ª a view similar to Fig. 4 but illustrating changed relations of parts, due to the carriage having moved all the way to the left; Fig. 6 a sectional elevation on the line 6—6 of Fig. 2, looking in the direction of the arrow; Fig. 7 an elevation of the right-hand end of the carriage; Figs. 8 and 9 detail views of parts concerned with the operation of the platen; Figs. 10 to 17 detail views of certain of the working parts hereinafter described; Fig. 18 a detail view showing the manner of interference of the lever 1021 with the wipe plate 821; Fig. 19 a detail view of the gage plate which coöperates with the platen; Fig. 20 an enlarged section on the line 20—20 of Fig. 2, and Fig. 21 a detail view of a feed lever 1122.

Inasmuch as the Burroughs machine, in connection with which we have chosen to illustrate and describe our invention, is well known, both as to construction and mode of operation, no detailed description of the various parts will be given, except as to those particular parts of the machine which are more or less concerned with the construction and operation of the parts of our mechanism or improvements thereof.

The Burroughs adding machine is provided with a series of pinions 916, to each of which is secured an adding wheel or dial 912. These pinions and adding wheels which are mounted in a frame 910, swung on a cross shaft 900, coöperate with a series of racks 610 for the transfer of values to the adding wheels in the accumulation of individual items and for the transfer of values from the adding wheels to the racks in the operation of taking a total. In the usual operation of a Burroughs machine, the pinion frame is swung forwardly upon the initial movement of the operating handle, thereby removing the adding wheel pinions from mesh with their racks, after which the racks corresponding with the particular denominations whose keys have been set, will descend distances corresponding in value with the value of the particular keys depressed or set. Upon the return movement of the operating handle the pinion frame will be swung rearwardly and the adding wheel pinions thereby restored to mesh with the racks, so that upon the return or upward movement of the operated racks the values thereof will be transferred to the adding wheels which will indicate the amount or item set up in the keyboard and will thereafter receive any additional items and exhibit the total or accumulation thereof. This swinging of the pinion frame into and out of mesh with the racks 610 is under the control of certain levers and connections actuated by the machine in its operation. As is well known, the pinion frame coöperates directly with the bifurcated arm or pitman 914, which when moved to the right (Fig. 1) swings the pinion frame out of mesh and when moved to the left, swings it into mesh. This arm or pitman is connected at its rear end with the depending arm of a three-armed rocking lever 913, with the result that the pitman partakes of the movements of such three-armed lever. This latter lever is operated by means of a rocking lever 813 pivoted on the shaft 800 and rocked forwardly and backwardly in the backward and forward movements of the operating handle and the main operating shaft of the machine. This lever 813 carries at its upper end a pivoted wipe plate 821 which is adapted to coöperate with the two studs 961 and 961ª projecting from the two corresponding arms of the lever 913. As is well known, in the usual operation of a Burroughs machine, the wipe plate 821 engages the stud 961ª in the initial rocking movement of the lever 813, which movement is anti-clockwise (Fig. 1) and thereby rocks the lever 913 in such manner as to move the pitman 914 to the right (Fig. 1) and thereby swing the pinion frame 910 forwardly— that is, to the right in Fig. 1, out of mesh with the racks 610. In the usual operation of the machine the wipe plate 821 on the return rocking movement of the lever 813 engages the stud 961 and swings the lever 913 to normal position, thereby shifting the pitman 914 to the left and swinging the pinion frame rearwardly so that its adding wheel pinions will be restored to mesh with the racks. This is the usual and ordinary operation of the Burroughs machine so far as the swinging of the pinion frame is concerned and it will be understood that any interference with the functions of the wipe plate 821 will interfere with the swinging of the pinion frame and thereby permit the accumulating or non-accumulating of the items as determined, in the present instance, by the particular position of the movable paper carriage. Thus, the usual Burroughs machine is adapted at all times to print, list and accumulate individual items and the present invention contemplates that the accumulating function of the machine shall be operative or inoperative according to the position of the paper carriage at any particular time. In the present instance, the arrangement, however, is such that the accumulating funtion is normally eliminated or thrown out of action by a device or lever normally interfering with one of the functions of the wipe plate 821, but the accumulating function of the machine is adapted to be restored or be rendered operative by removal of such interference, which is controlled by the particular position of the paper carriage.

As indicated more particularly in Figs. 1, 2 and 4, the carriage comprises essentially a main frame 1767, adapted to travel back and forth transversely on the machine on tracks formed on the upper and lower edges of a bracket or supporting frame 1765 which is secured in any suitable maner to the back plate 1116 of the machine. By preference, ball bearings are provided between the carriage frame and its tracks, as clearly indicated in Fig. 4. The platen is mounted at its ends in a platen frame having end plates or brackets 1719, which plates are mounted to swing upon the studs 1761 at the upper end or edge of the main carriage frame in any suitable manner, with the result that the platen 1797 and its frame may be thrown back by the operator so as to expose the printing point or line (see Figs. 1, 2, 4 and 7). As indicated in Figs. 2 and 8, the platen spindle 1705 is extended at both ends and provided with knurled knobs for hand manipulation by the operator. For the purpose of securing automatic line spacing, we provide the platen spindle in the present instance, with a clutch and operating connections which are automatically operated by a movable part of the machine and at times as predetermined by the operator or as determined by the position of the carriage and according to a predetermined adjustment by the operator.

First describing the operating connections for the automatic line spacing, we provide the main carriage frame with a universal rod or bail 1723 shown more particularly in Fig. 2 and also in Figs. 4, 5 and 6, which bail is secured at its ends and also by preference at points intermediate of its length, to a rock shaft 1703, extending longitudinally of the main carriage frame and having bearings therein. This rock shaft extends parallel to the bail, which is adapted to be actuated or rocked by our novel mechanism in a manner hereinafter explained. One end of this rock shaft is operatively connected with the platen spindle, and in the present instance, this connection is at the right-hand end of the platen, viewed from the operator's side and shown at the left-hand side of Fig. 2, which is a rear elevation. Referring to the connection herein shown, particularly in Figs. 2, 4 and 7, the same comprises a bell-crank shaped lever 1711 secured to the extended end of the rock shaft 1703 and connected, in the present instance, by means of the two links 1710 and 1712, with the clutch device for directly operating the platen. The object of the provision of the double links is to enable the platen frame 1719 to be swung upon the main carriage frame 1765 on the studs 1757, by pressure exerted by the operator on the finger pieces 1790 or otherwise, Figs. 2 and 7. The two links are pivoted together at their adjacent ends on the pin or rivet 1757, the lower link being itself pivoted at its lower end to the bell-crank lever 1711 on the pin or stud 1758, and the upper link 1712 being pivotally connected by means of the stud 1753 with the barrel or casing of the device hereinafter explained, Figs. 7 and 8. The lower link 1710 is slotted intermediate its length to receive a stationary stud or pin 1760, projecting laterally from one of the side plates 1717 of the main carriage frame 1767. This pin and slot connection between the lower link and the carriage frame serves not only to limit the longitudinal movements of such link, but also to keep the same in proper alinement for its thrust which is communicated to the clutch device. A spring 1783 secured at its ends to the pins 1758 and 1760 respectively, tends to draw the link 1710 upwardly, but such movement is resisted by the spring 1781 of superior power which is directly connected to the bail 1723.

Referring next to the clutch device, the same comprises, as illustrated in Figs. 7, 8 and 9, a driving member or barrel 1739, which is operatively connected with the upper link 1712 and mounted loosely upon the platen spindle 1705. Within this barrel or clutch ring is arranged the driven member which is in form of a disk 1740, keyed to the platen spindle and arranged to be operatively connected with the clutch ring at every operation of the line spacing bail 1723. This clutch disk is provided on its margin with a series of angular or reëntrant notches 1740$^a$, adapted to receive a corresponding series of short rollers 1764. These rollers are normally spring pressed by springs 1784 in an upward direction in the acute angle between such notches and the inner or clutching surface of the ring, with the result that when the clutch ring is moved in one direction, as for instance in an anti-clockwise direction (Fig. 7) during the upward movement of the links 1710 and 1712, such clutch ring will move freely, inasmuch as in this direction of movement the rollers are incapable of clutching engagement, but upon the movement of such clutch ring in the other direction, such rollers will engage that ring and the clutch disk 1740, together with the platen spindle 1705 will be moved or rocked a distance depending upon the degree of movement of the links, as predetermined by the operator, in the manner hereinafter explained. For the purpose of manually controlling this clutch device and thereby permitting the platen to be turned in either direction as desired by the operator, we provide a disk 1741 to which the right-hand knob 1705$^a$ of the platen is secured, Fig. 8, which disk is provided with a series of pins 1764 1/2, corresponding in number to the number of notches and rollers in the clutch disk. The purpose of this manually operated disk and pins which are illustrated in perspective in Fig. 9, is to enable the operator to forcibly press such rollers toward the inner corner of the notches against the tension of their springs, with the result that such rollers will be pressed out of clutching engagement with the clutch ring, leaving the platen to be freely turned by the operator.

It will be understood from the foregoing description that when the bail 1723 is depressed by the mechanism hereinafter described, the shaft 1703 will be rocked in an anti-clockwise direction and the two links will be moved upwardly and the clutch ring thereby freely moved in an anti-clockwise direction (Fig. 7) without clutching engagement with the clutch disk. However, when the bail and the other associated parts are restored to normal position the links in their return or downward movement will rotate the clutch ring in a clockwise direction (Fig. 7) and as in this direction of movement the clutch ring is in clutching engagement with the clutch disk 1740, the latter will be correspondingly rotated in a clockwise direction. For the purpose of varying the amount of a line spacing, we provide suitable mechanism such as the adjusting or regulating screw 1755 screwing into one of the side plates 1117 of the carriage frame and arranged in the path of movement of the lower arm of the bell-crank lever 1711. It will be understood that when the adjusting screw is screwed inwardly to its full extent, the amount of line spacing is at the minimum and that when such screw is adjusted to its outward limit, the amount of line spacing is at maximum.

Inasmuch as the line spacing bail 1723 is of considerable length, being substantially the same length as the carriage frame, it is obvious that owing to the spring or resiliency thereof, the same amount of movement by the feed arm as hereinafter explained, at different points along the length of such bail, would have different effects upon the amount of line spacing, were not some provision made to overcome this effect of resiliency of the bail. The provision adopted in the present instance consists, as illustrated, of two clutch faces between the shaft 1703 and the arm or bell-crank 1711, the clutch face 1703$^a$ on the shaft 1703 being substantially semi-cylindrical or a half segment and the clutch face 1711$^a$ formed on a hub on the arm 1711 being, in the present instance, somewhat greater than a quarter segment, leaving a segmental opening 1703$^b$ on one side of the shaft 1703, while the other two adjacent faces of the clutches are held together by the springs 1781 and 1783. As indicated in Figs. 2 and 7 the parts just described are held in proper relative position by a stud 1703$^B$ at the end of the shaft 1703. When the bail 1723 is rocked downwardly, its clutch face is removed from against the other clutch face, with the result that the latter is permitted to follow up the former by reason of the tension of the spring 1783 and such movement continues until the bell-crank 1711 contacts the regulating screw, but the movement of the shaft 1703 may continue, owing to the provision of the segmental space 1703$^b$. It will be understood from the foregoing that the bail has a greater arc of movement than the arm 1711, so that all variations in the amount of movement of the bail can have no effect upon the amount or degree of movement of the clutch device. This lost motion also provides for varying the length of feed in the line spacing. The bail 1723 has a uniform length of swing, whereas the arm 1711 must vary in the extent of its movement according to the adjustments of the stop-screw 1755. The bail does not, therefore, directly drive the arm, but the latter under the influence of the spring 1783 follows the bail in the manner already described and the lost motion provided for between the clutch members 1703$^a$ and 1711$^a$ allows the downward movement of the bail to continue after the arm 1711 has brought up against the stop screw 1755. This lost motion is taken up in the return movement by the spring 1781 and then the latter actuates the arm 1711 and its connecting parts to effect the line spacing.

The carriage frame is movable longitudinally—that is transversely of the machine—and is at all times under a spring tension tending to draw or move it toward the left whenever permitted by the escapement mechanism, which determines the different columnar positions of the carriage, as hereinafter explained. To this end, a band or cord 1192$^a$ is attached to the right-hand end of the carriage frame and connected with the compound spring drums 1192 and 1193, as seen in Fig. 2.

Referring first to the interfering device just mentioned, such device comprises in the present instance a lever 1021 pivoted intermediate its length on a vertical axis or pin 1058 having a bearing in a plate 1022 secured at some fixed point on the side frame (see Figs. 1 and 18). This interference lever is pivoted in such manner as to have a movement at its ends transversely of the machine. As shown in Fig. 18, the normal position of this lever is indicated by full lines and its other or shifted position is indicated by the dotted lines. The forward end of the lever is normally arranged in the path of movement of the wipe plate 821, so as to interfere with the latter at the end of its rearward movement and the beginning of its return movement, with the result that such lever interferes with one of the functions of the wipe plate by preventing its engagement with the pin or stud 961. Consequently, upon the restoration of the operating handle or of the main shaft of the machine to normal position, the arm 913 and pitman 914 will not be restored and the pinion frame and its pinions will be left out of mesh with the racks 610. When this interference is in normal or operative position, the items set up on the keyboard will be printed and listed as usual, but such items will not be transferred to the adding wheels, inasmuch as their pinions will be kept out of mesh with the racks during the movement of the latter—that is to say, such items will be printed but will not be accumulated and this condition will continue so long as the interference lever remains in its operative position and thus interferes with the wipe plate 821. However, as hereinbefore stated, the interference lever is under the control of the paper carriage by novel connections, with the result that in a certain position or positions of the paper carriage the interference lever will be rendered inoperative.

Referring next to the control of the interference by the carriage, the end plates 1717 of the carriage frame, as indicated in Figs. 1, 2 and 7, are extended below the lower edge of the carriage frame proper and connected by a transverse or longitudinal rod 1704. Upon this rod are mounted one or more devices or stops which are adjustable thereon and which are adapted, at the will of the operator, to actuate the interference lever, through connections hereinafter described, to thereby render such lever inoperative. In the present instance, these devices each consists of a block or stop 1792, illustrated in general in Fig. 2 and in detail in Figs. 10, 11, 12 and 14. Each block is provided with a transverse opening so as to fit upon the transverse rod 1704 which is provided with a longitudinal keyway, in order to receive the feather of a follower or thrust plate 1793, as seen in Fig. 14. This plate and consequently the entire block itself is adapted to be clamped to the transverse rod 1704 by means of the set screw 1792ª screwing into the block and against the thrust plate. By these means, each one of the blocks or stops may be independently adjusted to any predetermined position on the rod 1704 and maintained in that position. As indicated in the perspective view, Fig. 12, each block is provided with a contact or actuating finger 1799, which is pivoted upon one end of the block and arranged to be thrown inwardly toward the machine to operative position or outwardly or longitudinally of the rod 1704 to inoperative position. This contact finger constitutes the means for actuating the interference lever and to remove the latter from its operative position when the carriage is in a certain predetermined position or positions for that purpose. The operating connections between the contact finger 1799 and the interference lever consist of a pivoted arm 1119, which is pivotally connected with one end of the link 1118, whose other end is connected with or hooked over the rear end of the interference lever (see Figs. 1, 3, 12 and 18). The pivoted arm 1119 is mounted so as to swing or rock in a horizontal plane and in the present instance such arm is pivoted at its inner end upon the upper end of a bracket plate 1120, which is secured to the back plate of the machine. This pivoted arm normally projects rearwardly and in the path of movement of the contact finger 1799, which as described is mounted on and therefore movable with the carriage, with the result that when the contact finger is adjusted inwardly to operative position, it will contact and rock or swing the pivoted arm 1119 to the right when viewed as in Fig. 12. This movement is communicated through the link 1118 to the interference lever, with the result that such lever will be moved from its normal position indicated in full lines, which is its operative position, to its inoperative position illustrated in dotted lines in Fig. 18. For the purpose of centering or accurately determining the normal position of the interference lever and maintaining it in such position, we provide suitable means such as, in the present instance, a pivoted centering bar or arm 1117, as clearly indicated in Figs. 3 and 18. This bar or arm, which is normally downwardly pressed by the spring 1180, is pivoted at one end to the inner side of the back plate 1116 of the machine and is provided toward its other end with an inverted V-shaped notch or recess 1117ª, entering from its under edge. When the parts are in normal position, the upper edge of the interference lever is positioned in the apex of the recess or notch, which thus centers or accurately determines the proper position of such lever but does not interfere with the transverse movement of such lever, inasmuch as the arm 1117 will move against the tension of its spring whenever the interference lever is shifted laterally. It will be understood from the foregoing description that whenever the carriage is in such position that none of the contact fingers 1799 will be presented against the pivoted arm 1119 or in case one or more of such contact fingers are adjusted to inoperative position, the interference lever will be operative—that is it will prevent the adding machine from accumulating items and will continue to do so as long as said conditions at the carriage remain the same. When, however, the carriage has been so moved as to bring one of the contact fingers in a position to contact said pivoted arm 1119, which projects into the path of movement of the contact fingers when in operative position, such arm will be rocked and the interference lever thereby shifted to inoperative position through the connections already described. It will be understood that any desired number of these contact fingers and adjustable blocks may be provided on the carriage according to the particular character of accountant work to be performed, but in the present instance, as illustrated in Fig. 2, we have shown seven of these blocks and contact fingers in order to take care of seven different columns on a single sheet of paper. However, it will be understood that the contact fingers of the different blocks are adjusted or set to operative or inoperative position according to whether the items in the particular column or columns are to be accumulated. For instance, in case the items of alternate columns are to be accumulated, then the alternate contact fingers corresponding to such alternate columns are adjusted to operative position, or in case the items of one or more only of the columns are to be accumulated, then the contact finger or fingers corresponding to those particular columns are to be adjusted to operative position. Furthermore, in case the machine is to be employed simply for printing and listing without any accumulation at all, all of the contact fingers are adjusted to inoperative position so as to have no effect whatever upon the interference lever, but in case it is desired to accumulate the items of all of the columns and thus use the machine as an ordinary Burroughs machine, then all of the contact fingers are thrown inwardly to operative position so as to keep the interference lever inoperative at all positions of the carriage.

In order to provide for line spacing automatically controlled by the operations of the machine, we provide operating connections between the bail 1723 and a movable part of the machine and to this end a feed arm or lever 1124 pivoted on the shaft 1101 is extended through an opening or slot in the back plate of the machine (Figs. 1, 4, 5, 6 and 7). The inner or forward end of this pivoted arm is provided with a small roller 1131 which is adapted to coöperate with a cam plate 1125 secured to the usual shaft 1100 of a Burroughs machine, which shaft is operated or rocked in every operation of the machine. The contour of the cam face of this cam, as illustrated particularly in Fig. 4, is such as to give the arm or lever 1124 a gradual movement, increasing until the handle or the main shaft of the machine reaches approximately the middle of its forward stroke and then gradually decreasing and coming to rest before the handle or main shaft reaches the end of its forward stroke. The object of this construction is to prevent possibility of overthrow of the platen as hereinafter explained. The outer or rearward end of the feed arm carries an arm 1123 pivoted thereto intermediate its length and normally spring pressed to normal position as indicated in Figs. 4, 6 and 7, by means of a spring 1181 fastened to the stud 1123$^c$. As indicated in detail in Fig. 15, this arm is provided with lateral lugs 1123$^a$ and 1123$^b$, which serve as stops to the movement thereof when thrown or adjusted to the positions indicated in Figs. 4 and 5. The arm 1123 is pivoted upon one side of the feed arm 1124 and upon the other side of such latter arm is pivoted a feed lever or hook 1122, which is normally positioned vertically as indicated in Fig. 4 and reciprocated at every operation of the machine by reason of its connection with the feed arm 1124. However, when the pivoted arm 1123 is adjusted to the position indicated in Fig. 5 the feed lever or hook is rocked to the position indicated in such latter figure, inasmuch as the spring 1181, whose upper end is connected thereto, is shifted, as to its lower connection, to a position bringing the line of pull or tension to the rear of the pivotal point of such hook or lever 1122, as clearly shown in the drawings (Fig. 5). The result of this rocking of the feed lever 1122 is to bring it into coöperative relation with the bail 1723 for in this adjusted position the bail is in the path of movement of the hook proper at the upper end of the feed lever, with the result that when such feed lever is depressed in the operation of the machine, the bail is rocked and the platen moved one line space. Thus, when the arm 1123 is adjusted by the operator to the position indicated in Fig. 5, the platen will be turned one line space at every operation of the machine. This adjustment and consequent operation of the platen occurs whenever the operator desires to list any particular set of individual items instead of printing consecutively and horizontally across the sheet of paper and such adjustment may be made for any of the columnar positions.

It is, of course, desirable to automatically line space at the end of each line and to this end we provide means for obtaining such line spacing whenever the carriage reaches its extreme position to the left. As herein shown, particularly in Figs. 1 and 2, we arrange on the last block on the right-hand side of the carriage, or the outermost one at the left when the machine is viewed as in Fig. 2, a depending cam or shoe 1715, in whose path of movement a toe 1122$^a$ projecting rearwardly from the lower end of the feed lever 1122 is positioned, with the result that when the carriage is in its extreme position to the left viewed from the operator's position, such cam or shoe will contact with and depress such toe and thereby rock the feed lever rearwardly as to its upper end as illustrated in Fig. 5$^a$. When, now, the machine is operated for the item in the last column, the feed lever operates the line spacing mechanism and causes the platen to be turned one line space either ready for another item to be listed below or ready to receive a horizontal row of items when the carriage is shifted back to initial position.

Further describing the last mentioned operation, it will be understood that when the shoe 1715 acts upon the toe 1122$^a$ the finger piece or arm 1123 is in the position shown in Fig. 4, the spring 1181 drawing the feed lever 1122 forward. The cam shoe thus acts against this spring. The latter continues to tend to draw the feed lever forward, but is prevented from disengaging the lever from the feed bail when the feed arm 1124 is rocked down by the cam 1125, because of the hook at the upper end of the feed lever 1122 having engaged over the flange of the feed bail, as illustrated in Fig. 5ª. Of course, the mere swinging of the lever 1122 on its pivot does not bring about this close engagement between the hook and the flange, but the cam shoe 1715 having brought the feed lever 1122 to bear against the front of the bail, the continued action of the cam shoe has the effect of slightly depressing the feed arm 1124 and drawing down the feed lever 1122. Hence when the cam 1125 acts to rock said arm 1124 downward, the feed bail will be lowered and the line-spacing accomplished. When the feed lever 1122 occupies its vertical position, as shown in Fig. 4, vibrations of the feed arm 1124 will effect automatic column-spacing in a manner hereinafter described. It will be seen that in the manner hereinbefore described the column-spacing adjustment is changed to the line-spacing adjustment automatically when the carriage reaches the farthest position to the left. The moving of the carriage back to the right results automatically in again establishing the column-spacing adjustment, for so long as the finger piece 1123 remains in the column-spacing adjustment, the spring 1181 is constantly tending to restore the lever 1122 to vertical or column-spacing position. It follows that when the movement of the carriage to the right takes the toe 1122ª from under the cam shoe 1715, the feed arm 1124 rising slightly, then the spring 1181 draws the feed lever 1122 forward, disengaging its hook from the flange of the feed bail, and causing said lever to take up its vertical or column-spacing position.

Describing next the escapement mechanism for stopping and positioning the carriage at different columnar positions and referring particularly to Figs. 2, 4, 5, 10, 11, 13, 16 and 17, such mechanism in the present instance comprises essentially two members 1190 and 1191, of which the latter is pivoted to the former on an axis or stud 1191ª and spring pressed to the position indicated in Fig. 13 by means of the spring 1182. The escapement member or abutment 1190 is in the form of a short arm secured at its forward end on a shaft 1102 and provided with a depending flange 1190ª, as clearly indicated in the perspective view, Fig. 11, which flange has on its rearward edge an opening or notch 1190ᵇ. The other escapement member or tongue 1191 is substantially a flat plate disposed in a vertical position and normally held by means of the spring 1182 to a position away from the depending flange of the other escapement member or abutment, as seen in Fig. 13. This escapement mechanism coöperates with the blocks 1792 hereinbefore described and to this end each of such blocks is provided on its forward face and at or near its lower edge with a lug or projection 1792ᵇ, as indicated in Fig. 10. In operation, the carriage is stopped in proper columnar position, as determined by the adjustment of the blocks on the rod 1704 by the contact of the lug 1792ᵇ against the escapement member or tongue 1191, which is thereby forced against the abutment 1190 and directly over the opening 1190ᵇ, as seen in Fig. 16. When the escapement mechanism is rocked downwardly by means of the feed lever 1122 through connections shown in Fig. 5 and hereinafter explained, the tongue 1191 will pass below the lug 1792ᵇ which will nevertheless be restrained against movement by one face of the abutment 1190, as detailed in Fig. 17. However, inasmuch as the tongue is spring pressed, it will now be restored to its normal position with the result that when the escapement mechanism is rocked upwardly or restored to normal position, the tongue passes upwardly on the outside of the lug 1792ᵇ and the opening 1190ᵇ is brought in position to register with the lug, which is thereupon free to pass through such opening and consequently pass by the escapement mechanism. The carriage is thereby permitted to be advanced to the next columnar position, as determined by the position or adjustment of the lug of the next adjacent block or stop 1792 on the right.

The means for automatically operating the escapement mechanism consists of a substantially vertical strip or bar 1121 whose lower end is pivotally connected to one side of the abutment 1190 and whose upper end is guided by a small bracket 1126 secured to the outer face of the back plate 1116 of the machine, Figs. 3, 4 and 5. The bar 1121 is thus capable of a vertical reciprocating movement and for the purpose of actuating or reciprocating it at the proper time in the operation of the machine, such bar is provided with a projection or lug 1151, arranged in the path of movement of the feed lever 1122 when the latter is in a position to coöperate therewith, as indicated in Fig. 4. To this end, the feed lever is provided on its forward edge with a vertical recess 1122ᵇ, thereby providing two shoulders, the upper one 1122ᶜ of which is adapted to contact with the lug 1151 on the down stroke of the feed lever and depress the bar 1121 to thereby rock the escapement members 1190 and 1191, with the results hereinbefore described. The recess in the bar 1122 is of such length that the feed lever travels some distance before it contacts and actuates the lug 1151 so that the escapement mechanism is operated only toward the end of the downward stroke of the rear end of the feed arm 1124.

When it is desired to simply print and list the items in one column, instead of in different columns consecutively across the sheet of paper, the arm 1123 is adjusted by hand to the position indicated in Fig. 5 and with the result that the feed lever is rocked into coöperative relation with the bail 1723 and removed from coöperative relation with the escapement mechanism, so that line spacing is effected without any columnar spacing or movement of the carriage laterally. In other words, the line spacing mechanism is rendered operative and the escapement mechanism is rendered inoperative.

For the purpose of shifting or adjusting the carriage by hand to any desired columnar position, we provide suitable mechanism and for this purpose we have shown in the present instance, a bar or strip 1724, Fig. 2, which is so constructed and arranged as to have both a longitudinal and a vertical movement by reason of a pin and slot connection with the carriage frame. As shown more particularly in Fig. 2, this bar is provided with oblique slots adapted to receive pins or studs 1762 projecting from the inner side of the carriage frame. For the hand manipulation or shifting of this bar, we provide a rod 1770 extended through one end of the carriage frame and terminating in a button or knob 1763 1/2, such rod and consequently the bar 1724 being normally held toward the left, viewed from the operator's position or toward the right in the rear elevation of Fig. 2, by means of the coiled spring 1785. This shifting bar 1724 is arranged to coöperate with the escapement operating lever or bar 1121 through the medium of an anti-friction roller 1130 mounted on the latter, whereby when the bar 1724 is operated and the anti-friction roller 1130 and its bar 1121 depressed, the escapement mechanism is rocked downwardly to a position entirely below the plane of the lugs 1792ᵇ and farther than moved in the ordinary operation of the machine and kept in such position so long as the operator holds the button 1763 1/2 inwardly pressed. By these means the escapement mechanism is rendered entirely inoperative and the carriage may thereupon be shifted by hand to the desired position or approximately so and the escapement mechanism be released and permitted to be restored to operative position, whereupon such mechanism will engage the lug 1792ᵇ of a stop or block 1792 corresponding to the columnar position at which the operator desires to set the carriage. Suitable means may be provided to limit the extreme movement of the carriage or to provide for any width of margin and in the present instance, for this purpose we provide an extra block or marginal stop 1792ᶜ on the left, or on the right when viewed as in Fig. 2, having a lug 1792ᵈ arranged to coöperate with and be stopped by the escapement mechanism.

It will be understood from the foregoing description that according to the present construction the accumulating mechanism of the adding machine is normally rendered inoperative, inasmuch as the interference lever is normally in position to interfere with the function of the wipe plate 821, but by means of the contact fingers or arms carried by and movable with the carriage, such interference with the accumulating mechanism is automatically removed so that the adding machine is arranged to accumulate or not accumulate according to the particular position of the carriage and according also to the particular contact fingers 1799 which have been adjusted to operative position. Moreover, the construction is such that the columnar positions of the carriage and consequently the relative position of and distances between the different columns on the sheet of paper, may be varied as determined by the operator.

It will be understood that the particular adjustment of the stop blocks 1792 and the contact fingers 1799 is determined by the operator as desired or according to the particular character of the accountant work to be performed, such blocks being adjusted along the rod 1704 to obtain the desired columnar positions of the carriage and the fingers 1799 being set to or removed from operative position according to whether the items in the particular column or columns corresponding thereto are to be accumulated or not. If such items are to be accumulated in any one column, the contact finger 1799 corresponding to that column is set or adjusted to the operative position, as illustrated in Fig. 12, but in case such items are not to be accumulated, such contact finger is adjusted to a position out of range with the contact arm 1119, that is to a position say longitudinal of the rod 1704. For example, assuming that the items printed consecutively horizontally across the sheet of paper are to be alternately added beginning with the first column, the contact fingers 1799 of the alternate blocks 1792 are adjusted to operative position—that is, according to the example assumed the contact fingers of the first, third, fifth, and seventh blocks. The contact fingers of the second, fourth and sixth blocks will be set or adjusted to operative position. As a result of this arrangement or adjustment the contact finger of the first block will shift the interference lever from its interfering position and thereby restore the adding machine as to its accumulating function and the item or amount set up on the keyboard of the machine will be communicated and indicated on the adding wheels in the usual manner when the first operation of the machine is completed. The carriage is now automatically shifted one columnar space to the left (or to the right when viewed as in Fig. 2) by reason of the operation of the escapement mechanism, in the manner hereinbefore described. However, the contact finger 1799 of the second block is in inoperative position so that by the time the carriage reaches the second columnar position the interfering lever will have been automatically restored to its interfering position, with the result that the accumulating function of the adding machine will be eliminated or thrown out of action. Consequently, the item or amount next set up on the machine and to be printed in the second column will not be accumulated, but simply printed. In this printing operation the escapement mechanism is again operated and the carriage, which is under spring tension, is permitted to move to the third columnar position, but as the contact finger 1799 corresponding to this third column is adjusted to operative position, the interfering lever will be actuated thereby and shifted so as to no longer interfere with the accumulating function of the adding machine. Any item or amount now set up on the machine will, in the operation of the machine, be accumulated or added to the amount or item of the first column. According to the present example or assumed adjustment of the machine, the same operations continue as just described until the carriage reaches its extreme outward position to the left, whereupon the shoe 1715 contacts the toe 1122ᵃ and rocks the bar 1122 to the position shown in Fig. 5, as hereinafter described and causes line spacing when the machine is operated for the item in the last column. It will be understood that if at any time it is desired to list a series of items consecutively in the same column, at any position of the paper carriage, the arm 1123 is adjusted by the operator to the position indicated in Fig. 5, with the result that the mechanism automatically controlling the cross movements of the carriage will no longer be operative, but the line spacing mechanism will be rendered operative and caused to move the platen one line space at every operation of the machine and thereby feed the paper so as to receive the items thus printed consecutively in a single list or column. For a clear understanding of the action of the contact fingers upon the interfering lever in the manner above described, we have in Fig. 12 shown a contact finger 1799 in operative relation with the operating arm 1119, under which conditions, the interference with the accumulating mechanism is removed and the adding machine rendered capable of accumulating the items to be printed and listed in the column represented by the particular contact finger, which is in such operative relation with the operating arm. Moreover, it will be understood that if it is desired to operate the machine as a normal Burroughs machine, all of the contact fingers may be adjusted to operative position, with the result that during the operations of the machine the interference lever is rendered inoperative so that all of the items printed across the sheet of paper are added or accumulated. Again, it will be understood that if it is desired to use the machine simply for printing and listing without accumulating, all of the contact fingers may be adjusted to inoperative position, with the result that the interference lever will be permitted to remain in its normal position so as to throw out or eliminate the accumulating function of the adding machine in all of its operations.

Another feature of our invention relates to a gage arranged to coöperate with the platen for the purpose of indicating to the operator the relative plane or position of the type for the different denominations and also indicating the horizontal printing line, in order that ruled paper may be adjusted to the proper position on the platen or the paper if once removed from the platen may be restored to its exact or original position thereon with respect to the type. In the present instance, as illustrated more particularly in Figs. 1, 2, 3, 4 and 19, such means comprise a strip or gage plate 1128 carried at or near the ends of two parallel arms 1128ᵃ, which are pivoted at their lower ends to brackets 1128ᵇ on the end plate 1116 of the machine. This gage plate is normally spring pressed in suitable manner as by means of a spring 1183 secured respectively to a fixed part of the machine and to one of the arms of the gage plate, as indicated in Figs. 3 and 4. This spring thus normally holds the gage plate in inoperative position against the end of the adding machine and away from the platen, so that in the operation of the gage, the operator rocks the same down upon the platen against the tension of the spring 1183. This gage, whose outer edge corresponds to the printing line, is suitably graduated on its upper surface to correspond with the different lines of type representing the different denominations, and in addition such gage may be provided with a decimal point separating the dollars from the cents and also commas for spacing the thousands of dollars. The normal position of the indicator or gage is the inoperative one, as illustrated in Fig. 4, and the arrangement is such that when the operator has finished his work with the gage, the latter will be automatically restored to its normal position by means of the spring.

We claim:

1. In an adding machine, the combination of adding and printing mechanisms, a movable paper carriage arranged to coöperate with the printing mechanism, a device moved in one direction to throw the adding mechanism out of action and in the other or return direction to restore such adding mechanism to action, and means controlled by the particular position of the paper carriage for interfering with the return movement of said device and thereby keep the adding mechanism out of action; substantially as described.

2. In an adding machine, the combination of adding and printing mechanisms, a movable paper carriage arranged to coöperate with the printing mechanism, a device moved in one direction to throw the adding mechanism out of action and in the other or return direction to restore such adding mechanism to action, and means normally interfering with the return movement of said device to keep the adding mechanism out of action but itself controlled as to its interfering action by the paper carriage; substantially as described.

3. In an adding machine, the combination of the adding and printing mechanism thereof, a movable paper carriage arranged to coöperate with the printing mechanism, a rocking lever for alternately throwing the adding mechanism out of and into action, and means under the control of the carriage for preventing the movement or actuation of such lever in that direction for throwing such adding mechanism into action; substantially as described.

4. In an adding machine, the combination of the adding and printing mechanisms thereof, a movable paper carriage arranged to coöperate with the printing mechanism, a rocking lever for alternately throwing the adding mechanism out of and into action, and means arranged to prevent the movement or actuation of such lever in that direction for throwing such adding mechanism into action and normally keeping the adding mechanism out of action, said means being under the control of the paper carriage whose position determines whether the adding mechanism is operative or inoperative; substantially as described.

5. In an adding machine, the combination of adding and printing mechanisms, a movable paper carriage arranged to coöperate with the printing mechanism, a device moved in one direction to throw the adding mechanism out of action and in the other or return direction to restore such adding mechanism to action, a rocking lever having an operating connection with said device, and means under the control of the paper carriage for destroying said connection at a time to prevent the return movement of the device and thereby keep the adding mechanism out of action; substantially as described.

6. In an adding machine, the combination of adding and printing mechanisms, a movable paper carriage arranged to coöperate with the printing mechanism, a device moved in one direction to throw the adding mechanism out of action and in the other or return direction to restore such adding mechanism to action, a rocking lever, a wiper block or plate carried thereby and adapted to reciprocate said device, and means under the control of the paper carriage for rendering said wiper plate inoperative at a time to prevent return movement of the device and thereby keep the adding mechanism out of action; substantially as described.

7. In an adding machine, the combination of adding and printing mechanisms, a movable paper carriage arranged to coöperate with the printing mechanism, a device moved in one direction to throw the adding mechanism out of action and in the other or return direction to restore such adding mechanism to action, a rocking lever, a wiper block or plate pivoted thereon and adapted to reciprocate said device, and a lever under the control of the paper carriage and normally in position to interfere with the action of the wiper plate to prevent return movement of said device and thereby keep the adding mechanism out of action; substantially as described.

8. In an adding machine, the combination of adding and printing mechanism the adding mechanism comprising wheels and actuators therefor a movable paper carriage arranged to coöperate with the printing mechanism, a rocking lever or pitman 914 whose reciprocations alternately throw the adding wheels into and out of coöperative relationship with their actuators, a rocking arm 813, a wipe plate 821 carried thereby and arranged to actuate the pitman, and means under the control of the paper carriage for interfering with the action of the wiper plate and arranged to render it inoperative at a time to prevent that movement of the pitman which throws the adding wheels into coöperative relationship with their actuators; substantially as described.

9. In an adding machine, the combination of adding and printing mechanism, the adding mechanism comprising wheels and actuators therefor a movable paper carriage arranged to coöperate with the printing mechanism, a rocking lever or pitman 914 whose reciprocations alternately throw the adding wheels into and out of coöperative relationship with their actuators, a rocking arm 813, a wiper plate 821 carried thereby and arranged to actuate the pitman, and a rocking lever under the control of the paper carriage and arranged to render the wiper plate inoperative at a time to prevent that movement which throws the adding wheels into coöperative relationship with their actuators; substantially as described.

10. In an adding machine, the combination of printing mechanism, a movable paper carriage coöperating therewith, adding mechanism comprising actuators and a series of adding wheels arranged to be thrown into and out of operative relationship therewith, a wiper plate normally acting to accomplish such operation of the adding wheels, and means under the control of the paper carriage for interfering with the action of the wiper plate and thereby preventing it from restoring the adding wheels to operative relationship with their actuators; substantially as described.

11. In an adding machine, the combination of printing mechanism, a movable paper carriage coöperating therewith, adding mechanism comprising actuators and a series of adding wheels arranged to be thrown into and out of operative relationship therewith, a wiper plate actuated by the machine in its operations, operating connections between the wiper plate and the adding wheels for controlling their operative and inoperative relationship with their actuators, and means under the control of the paper carriage for interfering with the action of the wiper plate and with its actuation of the operating connections thereby preventing the usual restoration of the adding wheels to operative relationship with said actuators; substantially as described.

12. In an adding machine, the combination of printing mechanism, a movable paper carriage coöperating therewith, adding mechanism comprising actuators and a series of adding wheels arranged to be thrown into and out of operative relationship therewith, a wiper plate normally acting to accomplish such operation of the adding wheels, and a rocking lever under the control of the paper carriage for interfering with the action of the wiper plate and thereby preventing the usual restoration of the adding wheels to operative relationship with said actuators; substantially as described.

13. In an adding machine, the combination of printing mechanism, a movable paper carriage coöperating therewith, adding mechanism comprising actuators and a series of adding wheels arranged to be thrown into and out of operative relationship therewith, a wiper plate coöperating with the adding wheels to rock them in both directions into and out of operative relationship with their actuators, and means under the control of the paper carriage and arranged to be interposed in the path of movement of the wiper plate to interfere with the action thereof and prevent it from rocking the adding wheels to operative relationship with said actuators; substantially as described.

14. In an adding machine, the combination of printing mechanism, a movable paper carriage coöperating therewith, adding mechanism comprising actuators and a series of adding wheels arranged to be thrown into and out of operative relationship therewith, a rock arm, a wiper plate pivoted thereon, operating connections between the adding wheels and wiper plate, and means, under the control of the paper carriage, for rocking the plate in one position of the rock arm to prevent its actuation of the operating connections at such time, thereby preventing restoration of the adding wheels to operative relationship with their actuators; substantially as described.

15. In an adding machine, the combination of printing mechanism, a movable paper carriage coöperating therewith, adding mechanism comprising actuators and a series of adding wheels arranged to be thrown into and out of operative relationship therewith, a rocking frame in which the adding wheels are mounted, operating connections for controlling the rocking of such frame, a wiper plate rocked to actuate said connections, and means under the control of the paper carriage for rendering the wiper plate inoperative in one position of its movement; substantially as described.

16. In an adding machine, the combination of printing mechanism, a movable paper carriage coöperating therewith, adding mechanism comprising actuators and a series of adding wheels arranged to be thrown into and out of operative relationship therewith, a rocking frame in which the adding wheels are mounted, operating connections for controlling the rocking of such frame, a wiper plate rocked to actuate said connections, and a lever normally interposed in the path of movement of the wiper plate to render the latter inoperative in one position of its movement and thereby interfere with its actuation of said connections, such lever being under the control of the paper carriage and adapted to be positioned in such interfering relation with the plate according to the particular position of the paper carriage; substantially as described.

17. In an adding machine, the combination of printing mechanism, a movable paper carriage coöperating therewith, operating mechanism adding mechanism having a series of adding wheels arranged to be thrown into and out of operative relationship with said operating mechanism of the machine, connections coöperating with the adding wheels and operatively connected with a movable part of the machine, and means under the control of the paper carriage for destroying said operative connection with the movable part of the machine; substantially as described.

18. In an adding machine, the combination of printing mechanism, a movable paper carriage coöperating therewith, operating mechanism adding mechanism having a series of adding wheels arranged to be thrown into and out of operative relationship with said operating mechanism of the machine, connections coöperating with the adding wheels and operatively connected with a movable part of the machine, and a rocking lever under the control of the paper carriage for destroying said operative connection with the movable part of the machine; substantially as described.

19. In an adding machine, the combination of printing and adding mechanism, a movable paper carriage coöperating with the printing mechanism, a lever movable into the path of movement of a movable part of the machine to interfere therewith and thereby eliminate the adding function of the machine, and means for determining or alining the said interfering position of the lever; substantially as described.

20. In an adding machine, the combination of printing and adding mechanism, a movable paper carriage coöperating with the printing mechanism, a lever movable into the path of movement of a movable part of the machine to interfere therewith and thereby eliminate the adding function of the machine, and a pivoted strip or bar arranged to engage the lever and aline the latter to its said interfering position; substantially as described.

21. In an adding machine, the combination of printing and adding mechanism, a movable paper carriage coöperating with the printing mechanism, a lever movable into the path of movement of a movable part of the machine to interfere therewith and thereby eliminate the adding function of the machine, and a pivoted bar located at right angles to the lever and spring-pressed thereagainst to normally hold and aline the same to its said interfering position; substantially as described.

22. In an adding machine, the combination of printing and adding mechanism, a movable paper carriage coöperating with the printing mechanism, a lever movable into the path of movement of a movable part of the machine to interfere therewith and thereby eliminate the adding function of the machine, and a pivoted bar located at right angles to the lever and having a V-shaped notch toward one end to engage the lever and thereby center or aline the latter in its interfering position; substantially as described.

23. In an adding machine, the combination of printing and adding mechanism, a movable paper carriage coöperating with the printing mechanism, a lever movable into the path of movement of a movable part of the machine to interfere therewith and thereby eliminate the adding function of the machine, and a bar pivoted at one end and movable in a plane at right angles to the lever, said bar being spring pressed toward the lever and having a V-shaped notch toward its free end to engage the lever and thereby aline the latter in its interfering position; substantially as described.

24. In an adding machine, the combination of printing and adding mechanisms, a laterally movable paper carriage coöperating with the printing mechanism, a device arranged to interfere with the usual operation of the machine to prevent addition, and a projection pivoted upon the paper carriage and arranged to control said device; substantially as described.

25. In an adding machine, the combination of printing and adding mechanisms, a laterally movable paper carriage coöperating with the printing mechanism, a device arranged to interfere with the usual operation of the machine to prevent addition, and a finger carried by and pivoted upon the paper carriage and adapted to be adjusted to a position to contact and actuate said device in the movement of the paper carriage; substantially as described.

26. In an adding machine, the combination of printing and adding mechanisms, a laterally movable paper carriage coöperating with the printing mechanism, a device arranged to interfere with the usual operation of the machine to prevent addition and a projection pivoted upon the paper carriage and adjustable longitudinally thereof, said projection being arranged to be swung to a position to actuate said device in the movement of the paper carriage; substantially as described.

27. In an adding machine, the combination of printing and adding mechanisms, a laterally movable paper carriage coöperating with the printing mechanism, a device arranged to interfere with the usual operation of the machine to prevent addition, said device being normally in position to so interfere, and a projection pivoted upon the paper carriage and adjustable longitudinally thereof, said projection being arranged to be swung to a position to actuate said device in the movement of the paper carriage and thereby withdraw the same from its position of interference; substantially as described.

28. In an adding machine, the combination of printing and adding mechanisms, a laterally movable paper carriage coöperating with the printing mechanism, a device arranged to interfere with the usual operation of the machine to prevent addition, and a series of fingers carried by and pivoted upon the paper carriage and adapted to be adjusted to a position to contact and actuate said device in the movement of the paper carriage, said fingers being independently adjustable longitudinally of the paper carriage; substantially as described.

29. In an adding machine, the combination of printing and adding mechanisms, a laterally movable paper carriage coöperating with the printing mechanism, a device arranged to interfere with the usual operation of the machine to prevent addition, a block mounted upon and adjustable longitudinally of the paper carriage, and a contact finger pivoted on the block and arranged to be moved to an operative position to actuate said device in the movement of the paper carriage; substantially as described.

30. In an adding machine, the combination of printing and adding mechanisms, a laterally movable paper carriage coöperating with the printing mechanism, a device arranged to interfere with the usual operation of the machine to prevent addition, a series of blocks mounted upon and independently adjustable longitudinally of the paper carriage, and contact fingers pivoted on the blocks and independently movable to an operative position to actuate said device in the movement of the paper carriage; substantially as described.

31. In an adding machine, the combination of printing and adding mechanisms, a laterally movable paper carriage coöperating with the printing mechanism, a device arranged to interfere with the usual operation of the machine to prevent addition, a series of blocks mounted upon the paper carriage, escapement mechanism coöperating with said blocks to determine the different columnar positions, and contact fingers pivoted on the blocks and independently movable to an operative position to actuate said device in the movement of the paper carriage; substantially as described.

32. In an adding machine, the combination of printing and adding mechanisms, a laterally movable paper carriage coöperating with the printing mechanism, a device arranged to interfere with the usual operation of the machine to prevent addition, a series of blocks mounted upon the paper carriage and independently adjustable longitudinally thereof to vary its different columnar positions, and contact fingers carried by the blocks to actuate said device in the movement of the paper carriage; substantially as described.

33. In an adding machine, the combination of printing and adding mechanisms, a laterally movable paper carriage coöperating with the printing mechanism, a device arranged to interfere with the usual operation of the machine to prevent addition, a series of blocks mounted upon the paper carriage and independently adjustable longitudinally thereof to vary its different columnar positions, escapement mechanism coöperating with the blocks, and contact fingers pivoted in the blocks and independently adjustable to operative position to actuate said device in the movement of the paper carriage; substantially as described.

34. In an adding machine, the combination of printing and adding mechanisms, a laterally movable paper carriage coöperating with the printing mechanism, a device arranged to interfere with the usual operation of the machine to prevent addition, escapement mechanism, a series of blocks mounted upon the paper carriage and independently adjustable longitudinally thereof, said block having projections with which said escapement mechanism coöperates, and contact fingers carried by the blocks and adjustable to any operative position to actuate said device in the movement of the paper carriage; substantially as described.

35. In an adding machine, the combination of printing and adding mechanisms, a laterally movable paper carriage coöperating with the printing mechanism, a device arranged to interfere with the usual operation of the machine to prevent addition, a rod mounted on and extending longitudinally of the paper carriage, a series of blocks arranged to slide longitudinally and to be held to any adjusted position thereon, and a corresponding series of contact fingers pivoted on the blocks and arranged to be moved to an operative position to actuate said device in the movement of the paper carriage; substantially as described.

36. In an adding machine, the combination of printing and adding mechanisms, a laterally movable paper carriage coöperating with the printing mechanism, a device arranged to interfere with the usual operation of the machine to prevent addition, a rod mounted on and extending longitudinally of the paper carriage, a series of blocks arranged to slide longitudinally and to be held to any adjusted position thereon, and a corresponding series of contact fingers pivoted on the blocks and arranged to be adjusted to project inwardly and thereby contact and actuate said device in the movement of the paper carriage; substantially as described.

37. In an adding machine, the combination of printing and adding mechanisms, a laterally movable carriage coöperating with the printing mechanism, a lever arranged to be rocked to a position to interfere with the ordinary operations of the adding mechanism to thereby eliminate the adding function of the machine, a contact finger carried by and pivoted on the paper carriage, a rock arm arranged adjacent the carriage and projecting into the path of movement of the contact finger when adjusted to operative position, and a connection between such rock arm and said lever, whereby such lever is controlled as to its action on the adding mechanism by the position of the paper carriage; substantially as described.

38. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, and a lever or bar operatively connected with the feed lever and arranged to operate either the line spacing mechanism or the escapement mechanism; substantially as described.

39. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, and a lever or bar operatively connected with the feed lever and normally in operative engagement with the escapement mechanism but arranged to be put into operative engagement with the line spacing mechanism; substantially as described.

40. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, and a lever or bar pivoted upon the feed lever and normally in operative engagement with the escapement mechanism but arranged to be shifted clear of such latter mechanism and into operative engagement with the line spacing mechanism; substantially as described.

41. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, and a lever or bar pivoted upon the feed lever and normally held with a yielding pressure into operative relation with the escapement mechanism; substantially as described.

42. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, and a lever or bar operatively connected with the feed lever and normally held with a yielding pressure into operative relation with the escapement mechanism but arranged to be shifted clear of such latter mechanism and into operative relation with the line spacing mechanism; substantially as described.

43. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, a lever or bar pivoted upon the feed lever and means coöperating with such lever for holding it with a yielding pressure into operative engagement or relation with either the escapement mechanism or the line spacing mechanism; substantially as described.

44. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, a lever or bar pivoted upon the feed lever, and a spring coöperating with such lever or bar and arranged to hold it with a yielding pressure into operative relation with either the escapement mechanism or the line spacing mechanism; substantially as described.

45. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, a lever or bar pivoted upon the feed lever, an arm also pivoted thereon, and a spring connected at one end with the arm and at the other end with said lever or bar and arranged to hold the latter in operative relation with either the escapement or the line spacing mechanism according to the position of said arm; substantially as described.

46. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, an actuating lever or bar pivoted upon the feed lever, an arm 44 pivoted on the feed lever and having stops coöperating with the actuating lever and feed lever, and a spring connected at one end to the actuating lever and at its other end to said arm for holding such actuating lever in engagement with either the escapement mechanism or the line spacing mechanism; substantially as described.

47. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, an actuating lever pivoted on the feed lever, an arm 44 also pivoted on the feed lever, and a spring 45 connected at one end to the actuating lever and at its other end to the arm 44 at a point on one side of the pivotal point thereof, whereby the actuating lever may be shifted and held shifted with a yielding pressure in operative relation with either the line spacing mechanism or the escapement mechanism by turning or adjusting the arm 44; substantially as described.

48. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, a universal rod or bail for operating the line spacing mechanism, and an actuating lever operatively connected with the feed lever and having a projection adapted, in one position, to engage and operate said bail, said actuating lever being adapted, in another position, to actuate the escapement mechanism; substantially as described.

49. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, a universal rod or bail for operating the line spacing mechanism, and an actuating lever operatively connected with the feed lever and having a hook adapted, in one position, to engage the bail but normally in operative relation with the escapement mechanism; substantially as described.

50. In an adding machine, the combination of printing and adding mechanisms, a laterally movable paper carriage having a platen and line spacing mechanism, escapement mechanism coöperating with the paper carriage to position it in different columnar positions, a feed lever operated in the operation of the machine, a universal rod or bail for operating the line spacing mechanism, and an actuating lever pivoted at its lower end to the feed lever and having at its upper end a hook to engage the bail, said actuating lever being normally in operative relation with the escapement mechanism but adapted to be shifted to cause its hook to engage and operate the bail in the operations of the machine; substantially as described.

51. In a machine of the character described, the combination of line-spacing mechanism; column-spacing mechanism, and an actuator for the latter adapted to automatically disconnect therefrom and connect with the line-spacing mechanism.

52. In a machine of the character described, the combination of line-spacing mechanism; column-spacing mechanism, and operating means common to said two mechanisms and automatically adjustable to connect with one or the other.

53. In a machine of the character described, the combination of line-spacing mechanism; column-spacing mechanism, and a single actuator automatically adjustable to connect with and disconnect from one or the other of said mechanisms.

54. In a machine of the character described, the combination of line-spacing mechanism; column-spacing mechanism, an actuator for the latter adapted to automatically disconnect therefrom and connect with the line-spacing mechanism, and means for effecting such disconnection and connection at will by hand.

55. In an adding machine and the like, the combination, of a platen, and line spacing mechanism comprising a friction clutch, the driven member of which is connected with the platen, an operating arm or link connected with the driving member of the clutch, and means for varying the degree of movement of said arm or link and consequently varying the amount of line space to any desired degree; substantially as described.

56. In an adding machine and the like, the combination, of a platen, and line spacing mechanism, comprising a friction clutch, the driven member of which is connected with the platen, an operating arm or link connected with the driving member of the clutch, and a rock shaft operated by the machine, said arm or link being spring pressed in a direction to move the driving member of the clutch, but restrained by said rock shaft until the latter is operated; substantially as described.

57. In an adding machine and the like, the combination, of a platen, and line spacing mechanism, comprising a friction clutch, the driven member of which is connected with the platen, an operating arm or link connected with the driving member of the clutch, and a spring pressed rock shaft operated by the machine and rocked thereby against its spring pressure, said arm or link being independently spring pressed in a direction to move the driving member of the clutch but restrained by said rock shaft whose spring pressure is superior to that of said arm; substantially as described.

58. In an adding machine and the like, the combination, of a platen, and line spacing mechanism, comprising a friction clutch, the driven member of which is connected with the platen, an operating arm or link connected with the driving member of the clutch, a rock arm operatively connected with said link, a rock shaft actuated by the machine in its operations, and differential clutch faces operatively connecting the rock arm and shaft and permitting the rock shaft to have a degree of movement in excess of the rock arm; substantially as described.

59. In an adding machine and the like, the combination, of a platen, and line spacing mechanism comprising a friction clutch, the driven member of which is connected with the platen, an operating arm or link connected with the driving member of the clutch, a spring pressed rock arm operatively connected with said link, a rock shaft actuated by the machine in its operations, a clutch face or member on the rock shaft, and a clutch member coöperating with but smaller than the other clutch member to permit relative movement therebetween; substantially as described.

60. In an adding machine and the like, the combination, of a platen, and line spacing mechanism comprising a friction clutch, the driven member of which is connected with the platen, an operating arm or link connected with the driving member of the clutch, a rock arm operatively connected with said link and spring pressed to move the driving member to a clutching position, and a rock shaft actuated by the machine in its operations and operatively connected with the rock arm to normally restrain it against movement but, when rocked in one direction, permitting it to be moved by said spring pressure and, when rocked back to normal position, positively actuating the arm and thereby moving the platen; substantially as described.

61. In an adding machine and the like, the combination, of a platen, and line spacing mechanism comprising a friction clutch, the driven member of which is connected with the platen, an operating arm or link connected with the driving member of the clutch, a rock arm operatively connected with said link and spring pressed to move the driving member to a clutching position, means for adjusting the degree of said movement of the rock arm, and means under the control of the machine in its operations for normally restraining the rock arm against such movement but permitting the same when the machine is operated and then restoring the rock arm against its spring pressure and thereby operating said clutch; substantially as described.

62. In an adding machine and the like, the combination, of a platen, and line spacing mechanism comprising a friction clutch, the driven member of which is connected with the platen, an operating arm or link connected with the driving member of the clutch, a rock arm operatively connected with said link and spring pressed to move the driving member to a clutching position, an adjustable or regulating screw arranged in the path of movement of the rock arm, and means under the control of the machine in its operations for normally restraining the rock shaft against such movement but permitting the same when the machine is operated and then restoring the rock arm, against its spring pressure and thereby operating said clutch; substantially as described.

63. In an adding machine and the like, the combination, of a platen, and line spacing mechanism comprising a friction clutch, the driven member of which is connected with the platen, an operating arm or link connected with the driving member of the clutch, a rock arm operatively connected with said link and spring pressed to move the driving member to a clutching position, an adjustable or regulating screw arranged in the path of movement of the rock arm, and a rock shaft actuated by the machine in its operations and operatively connected with rock arm to normally restrain the latter against movement by its spring but to permit such movement when actuated by the machine and then to restore the rock arm upon its return movement or rocking; substantially as described.

64. In an adding machine and the like, the combination, of a platen, and line spacing mechanism comprising a friction clutch, the driven member of which is connected with the platen, a slotted link or pitman connected with the driving member of the clutch, a fixed pin received by such link, a bell crank connected with the link for operating it, and a rock shaft connected with the bell crank for operating the clutch through the medium of the bell crank and link; substantially as described.

65. In an adding machine and the like, the combination, of a platen, and line spacing mechanism comprising a friction clutch, said clutch consisting of clutch ring as a driving member, a clutch disk or driven member connected with the platen and arranged within the clutch ring, said disk having a series of marginal notches, and a series of rollers arranged in the notches and adapted to form clutching engagement between the two clutch members in one direction of movement of the driving member; substantially as described.

66. In an adding machine and the like, the combination of a platen, and line spacing mechanism comprising a friction clutch, said clutch consisting of clutch ring as a driving member, a driven member or clutch disk secured to the platen spindle and arranged to coöperate with the clutch ring, said disk having a series of marginal notches, and a series of rollers arranged in the notches and adapted to form clutching engagement between the two clutching members in one direction of movement of the driving members; substantially as described.

67. In an adding machine and the like, the combination of a platen, and line spacing mechanism comprising a friction clutch, said clutch consisting of clutch ring as a driving member, a clutch disk or driven member connected with the platen and arranged within the clutch ring, said disk having a series of marginal notches, and a series of spring pressed rollers arranged in the notches and adapted to form clutching engagement between the two clutch members in one direction of movement of the driving member; substantially as described.

68. In an adding machine and the like, the combination, of a platen, and line spacing mechanism comprising a friction clutch, said clutch consisting of clutch ring as a driving member, a driven member or clutch disk secured to the platen spindle and arranged to coöperate with the clutch ring, said disk having a series of reëntrant notches, a series of rollers arranged in the notches and adapted to form clutching engagement between the two clutch members in one direction of movement of the driving member, and a series of springs acting on the rollers and tending to move them to clutching position; substantially as described.

69. In an adding machine and the like, the combination, with a platen and its spindles, of line spacing mechanism comprising a friction clutch and consisting of a driving member or clutch ring mounted to rotate on the platen spindle, a driven member or clutch disk secured to such spindle and arranged within the clutch ring, said disk having a series of marginal notches and a series of spring pressed rollers therein for forming clutching engagement in one direction of movement of the driving member; substantially as described.

70. In an adding machine and the like, the combination, of a platen, and line spacing mechanism comprising a friction clutch, said clutch consisting of clutch ring as a driving member, a clutch disk or driven member connected with the platen and arranged within the clutch ring, said disk having a series of marginal notches, a series of rollers in the notches arranged to form clutching engagement between the two clutch members in one direction of movement of the driving member, and means under the control of the operator for rotating the clutch disk and platen independently of the clutch ring; substantially as described.

71. In an adding machine and the like, the combination, of a platen, and line spacing mechanism comprising a friction clutch, said clutch consisting of clutch ring as a driving member, a clutch disk or driven member connected with the platen and arranged within the clutch ring, said disk having a series of marginal notches, a series of rollers in the notches arranged to form clutching engagement between the two clutch members in one direction of movement of the driving member, and a series of pins under the control of the operator and arranged to enter said notches and to govern the position of the rollers therein and thereby control the clutching action and permit the disk and platen to be moved independently of the clutch ring; substantially as described.

72. In an adding machine and the like, the combination, of a platen, and line spacing mechanism comprising a friction clutch, said clutch consisting of clutch ring as a driving member, a clutch disk or driven member connected with the platen and arranged within the clutch ring, said disk having a series of marginal notches, a series of rollers in the notches arranged to form clutching engagement between the two clutch members in one direction of movement of the driving member, a knob on the platen spindle for turning it, and a series of pins moved by the knob when operated and received within the notches to shift the rollers to inoperative position in the notches; substantially as described.

73. In an adding machine and the like, the combination, of a platen, and line spacing mechanism comprising a friction clutch, said clutch consisting of clutch ring as a driving member, a driven member or clutch disk secured to the platen spindle and arranged to coöperate with the clutch ring, said disk having a series of reëntrant notches, a series of rollers arranged in the notches and adapted to form clutching engagement between the two clutch members in one direction of movement of the driving member, a series of springs acting on the rollers and tending to move them to clutching position, and means under the control of the operator for restraining said rollers against such clutching action; substantially as described.

74. In an adding machine and the like, the combination, of a platen, and line spacing mechanism comprising a friction clutch, said clutch consisting of clutch ring as a driving member, a driven member or clutch disk secured to the platen spindle and arranged to coöperate with the clutch ring, said disk having a series of reëntrant notches, a series of rollers arranged in the notches and adapted to form clutching engagement between the two clutch members, in one direction of movement of the driving member, a series of springs acting on the rollers and tending to move them to clutching position, and a disk mounted on the spindle and having a series of pins entering said notches and, when turned by the operator, arranged to hold the rollers against clutching action; substantially as described.

75. In an adding machine and the like, the combination, of a longitudinally movable paper carriage having a platen, a paper feed bail mounted in said carriage and having a uniform extent of movement therein, an operating member adapted to engage said bail at different points under different positions of the carriage to impart said uniform movement, and line spacing mechanism coöperating with the platen and operated by said bail but having a predetermined degree of movement regulated independently thereof; substantially as described.

76. In an adding machine and the like, the combination, of a longitudinally movable paper carriage having a platen, a paper feed bail mounted in said carriage and having a uniform extent of movement therein, an operating member adapted to engage said bail at different points under different positions of the carriage to impart said uniform movement, line spacing mechanism coöperating with the platen, and operating connections between said mechanism and the bail having a predetermined degree of movement regulated independently thereof; substantially as described.

77. In an adding machine and the like, the combination, of a longitudinally movable paper carriage having a platen, a paper feed bail mounted in said carriage and arranged to be rocked at every operation of the machine, line spacing mechanism coöperating with the platen and operated by said bail, and operating connections between said mechanism and the bail, which connections are spring pressed tending to move the line spacing mechanism to an operating or engaging position with respect to the platen, but normally restrained by the bail; substantially as described.

78. In an adding machine and the like, the combination, of a longitudinally movable paper carriage having a platen, a paper feed bail mounted in said carriage and arranged to be rocked at every operation of the machine, a friction clutch, the driven member of which is connected with the platen, an operating connection between the driving member of the clutch and the bail, and means for varying the degree of movement of said connection with the same movement of bail; substantially as described.

79. In an adding machine and the like, the combination, of a longitudinally movable paper carriage having a platen, a paper feed bail mounted in said carriage and arranged to be rocked at every operation of the machine, a friction clutch, the driven member of which is connected with the platen, an operating arm connected with the driving member of the clutch, a rock arm connected with said arm and operated by the bail, and means for varying the degree of movement of the operating arm; substantially as described.

80. In an adding machine and the like, the combination, of a longitudinally movable paper carriage having a platen, a paper feed bail mounted in said carriage and arranged to be rocked at every operation of the machine, a friction clutch, the driven member of which is connected with the platen, an operating arm connected with the driving member of the clutch, and a rock arm operatively connected with said arm and having a clutch connection with the bail to permit the rock arm and operating arm to move a less distance relatively than the bail; substantially as described.

81. In an adding machine and the like, the combination, of a longitudinally movable paper carriage having a platen, a paper feed bail mounted in said carriage and arranged to be rocked at every operation of the machine, a friction clutch, the driven member of which is connected with the platen, an operating arm connected with the driving member of the clutch, and normally spring pressed in a direction tending to move the driving member of the clutch to a position ready to engage the driven member, said arm being operatively connected with the bail and normally restrained thereby but permitted to move to engaging position when the bail is rocked and arranged to drive the driven member and platen when the bail is restored; substantially as described.

82. In an adding machine and the like, the combination, of a longitudinally movable paper carriage having a platen, a paper feed bail mounted in said carriage and arranged to be rocked at every operation of the machine, a friction clutch, the driven member of which is connected with the platen, an operating arm connected with the driving member of the clutch, and normally spring pressed in a direction to move the driving member of the clutch to a position ready to engage the driven member, and a rock arm forming an operating connection between the operating arm and the bail, said operating arm being normally restrained against movement by the bail but permitted to move the driving member of the clutch to engaging position when the bail is rocked and to drive the driven member and platen when the bail is restored; substantially as described.

83. In a machine of the character described, the combination of an intermittently movable paper carrier, a pivotal support therefor, and means for operating the paper carrier comprising links whose pivotal connection normally coincides with the pivot of said support for the paper carrier.

84. In a machine of the character described, the combination of a platen roller, a pivotally mounted support therefor, and feed mechanism for the platen roller comprising links pivotally united coincidently with the pivot of said support.

85. In an adding machine and the like, the combination, with the fixed case of the machine and with the platen thereof movable into and out of printing position, of an indicator or gage pivoted upon said case and normally withheld from said platen when the latter is in or out of printing position, but arranged to be swung to a position upon the platen when the latter is out of printing position to indicate the printing line; substantially as described.

86. In an adding machine and the like, the combination, with the fixed case of the machine and with the platen thereof movable into and out of printing position, of an indicator or gage pivoted upon said case and arranged to be swung to a position upon the platen when the latter is out of printing position to indicate the printing line, and a spring connected with the indicator or gage for normally holding the same toward the case and away from the platen when the latter is in or out of printing position; substantially as described.

87. The combination with the inclosing casing of the machine, and the platen mounted on the exterior of said casing and movable toward and from the same; of a gage plate pivotally mounted within the casing and protruding therefrom for engagement with the platen and a spring applied to said plate within the casing.

88. The combination with the inclosing casing and the platen mounted exteriorly thereof and movable toward and from the same; of a gage resiliently mounted within the casing and protruding therefrom for engagement with the platen.

HARVEY L. FISHER.
JESSE G. VINCENT.

Witnesses:
ALVAN MACAULEY,
W. B. BEAL.